United States Patent
Tidridge

(10) Patent No.: US 9,986,727 B2
(45) Date of Patent: Jun. 5, 2018

(54) FISH GLOVE/MITT WITH INTEGRAL NETTING

(71) Applicant: Aaron V. Tidridge, Milford, PA (US)

(72) Inventor: Aaron V. Tidridge, Milford, PA (US)

( * ) Notice: Subject to any disclaimer, the term of this patent is extended or adjusted under 35 U.S.C. 154(b) by 345 days.

(21) Appl. No.: 14/860,187

(22) Filed: Sep. 21, 2015

(65) Prior Publication Data

US 2016/0095368 A1     Apr. 7, 2016

Related U.S. Application Data

(60) Provisional application No. 62/071,306, filed on Sep. 19, 2014.

(51) Int. Cl.
| | | |
|---|---|---|
| *A01K 97/14* | (2006.01) |
| *A01K 74/00* | (2006.01) |
| *A01K 77/00* | (2006.01) |
| *A41D 19/01* | (2006.01) |

(52) U.S. Cl.
CPC ............. *A01K 97/14* (2013.01); *A01K 74/00* (2013.01); *A01K 77/00* (2013.01); *A41D 19/01* (2013.01)

(58) Field of Classification Search
CPC ........ A01K 97/14; A01K 97/00; A01K 74/00; A01K 77/00; A41D 19/01
See application file for complete search history.

(56) References Cited

U.S. PATENT DOCUMENTS

| | | | | |
|---|---|---|---|---|
| 2,616,745 | A * | 11/1952 | Alston | A01K 97/18 15/227 |
| 5,367,712 | A * | 11/1994 | Smith | A41D 19/015 2/161.1 |
| 5,544,362 | A * | 8/1996 | Synek | A63B 71/143 2/19 |
| 6,993,793 | B1 * | 2/2006 | Li | A41D 19/01558 2/161.8 |
| 7,757,303 | B2 * | 7/2010 | Miller | A41D 13/08 128/878 |
| 8,844,063 | B2 * | 9/2014 | Newman | A63B 71/143 2/19 |
| 8,966,664 | B2 * | 3/2015 | Walsh | A41D 19/0037 2/17 |
| 2004/0068777 | A1 * | 4/2004 | Wheelington, II | A63B 71/143 2/161.1 |
| 2005/0160516 | A1 * | 7/2005 | Price | A41D 19/01547 2/161.6 |
| 2010/0314427 | A1 * | 12/2010 | Cartwright | A01K 97/06 224/576 |

(Continued)

FOREIGN PATENT DOCUMENTS

| | | | | |
|---|---|---|---|---|
| JP | 2008086257 A | * | 4/2008 | ............. A01K 77/00 |
| JP | 2011004694 A | * | 1/2011 | ............. A01K 77/00 |

(Continued)

*Primary Examiner* — Christopher R Harmon
(74) *Attorney, Agent, or Firm* — Gary P. Topolosky

(57) ABSTRACT

A fishing glove/mitt device comprises: a fingers component; a thumb netting support, a flexible netting element between the wearer's fingers and thumb, and a palm-cuff wrap. The wearer of this device can manipulate the netting portion between his/her fingers and thumb to at least partially close it about the fish being caught. An optional net frame support may extend angularly outwardly and upwardly between the thumb and fingers or between side supports of this netting element.

17 Claims, 11 Drawing Sheets

(56) References Cited

U.S. PATENT DOCUMENTS

| | | | | |
|---|---|---|---|---|
| 2011/0023211 A1* | 2/2011 | Blankenship | .......... | A41D 27/08 |
| | | | | 2/161.2 |
| 2011/0185473 A1* | 8/2011 | Voravan | ................ | A41D 19/00 |
| | | | | 2/161.2 |
| 2012/0174291 A1* | 7/2012 | Fraze | ..................... | A41F 1/008 |
| | | | | 2/270 |

FOREIGN PATENT DOCUMENTS

| | | | | |
|---|---|---|---|---|
| KR | 20130138056 A | * | 12/2013 | ............. A01K 77/00 |
| WO | WO-2017052670 A1 | * | 3/2017 | ............. A01K 77/00 |

* cited by examiner

FISH GLOVE/MITT WITH INTEGRAL NETTING

CROSS-REFERENCE TO RELATED APPLICATIONS

This is a perfection of Provisional Application No. 62/071,306, filed on Sep. 19, 2014, the disclosure of which is fully incorporated by reference herein.

FIELD OF THE INVENTION

This invention relates to the field of fishing accessories and to devices for assisting with the catching of live fish. More particularly, it relates to a new and improved glove having an integral fishing net that can be manipulated to at least partially close on itself. The net, or netting, wraps about a hoop that extends between the thumb and fingers of the glove wearer. It allows its wearer to catch a fish "twice" . . . by grabbing and securing a fish after reeling it in. It can also be used for catching one's own bait.

BACKGROUND OF THE INVENTION

There were several fishing gloves found in the prior art. But they were all gloves per se, i.e., meant to protect a fisherman's hands from injuries while using a fishing reel, holding a caught fish and/or cutting up one's catch. There is also a well known collection of art pertaining to fish nets in varying shapes and sizes, many extending from poles, walking sticks and/or boat oars. But none of the prior art found showed anything quite like the present invention. Nothing anticipates this device nor renders it an obvious combination from two, non-analogous fields of art: protective gloves and fishing nets.

SUMMARY OF THE INVENTION

One preferred embodiment of this glove/mitt device comprises four main components: a fingers component; a thumb netting support, the netting element between the wearer's fingers and thumb, and a palm-cuff wrap. When made of the proper flexible materials, this device can easily manipulate the netting portion between fingers and thumb open or at least partially closed. Optionally, a net frame support may extend angularly outwardly and upwardly from the fingers component. Preferably, that support is made of a rigid or semi-rigid material that won't otherwise interfere with full fishing glove manipulation around a fish being caught in the netting portion of this device.

Still other preferred embodiments include: (a) pads for the upper tips of the finger component, said pads (for the middle, ring and pinky fingers) helping the wearer better feel the pressures needed to squeeze his/her netting about a catch; and (b) easily/rapidly adjustable straps on the palm cuff wrap which may or may not have a tape measuring component. In some instances, one or more of the finger tip pads may include a separate protrusion for allowing the wearer/angler to "lip" the fish by grabbing the bottom lip of the catch therewith.

It is the inventor's current intent to make and sell this device through his business venture currently referred to as Fish and Game Paw Company™.

BRIEF DESCRIPTION OF THE DRAWINGS

Further features, objectives and advantages will be made clearer from the following detailed description made with reference to the accompanying drawings in which.

DESCRIPTION OF PREFERRED EMBODIMENTS

Elements in the accompanying figures are not necessarily drawn to scale. And the main embodiments shown are for a right-handed fisherman to wear on his left hand. It is to be understood, however, that a mirror image version will be made and sold for "southpaw" dominant anglers to wear on their right hand. Also, the main components of this invention that are consistent in the respective versions are commonly numbered though in the next hundred series.

Figure 1:
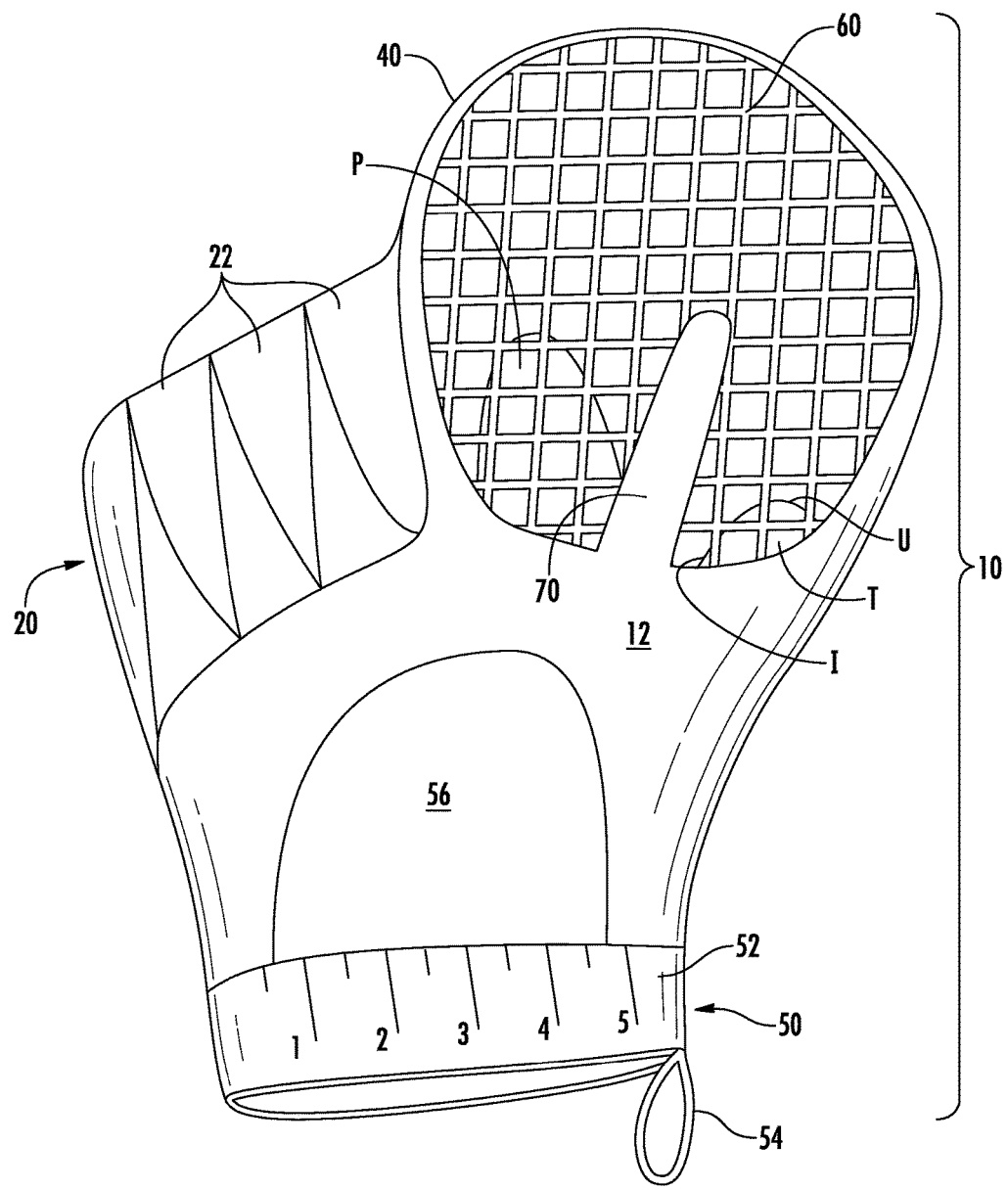
FIG. 1 is a top plan view of the exterior to a left-handed fishing glove as per a first embodiment of this invention.
Figure 2:
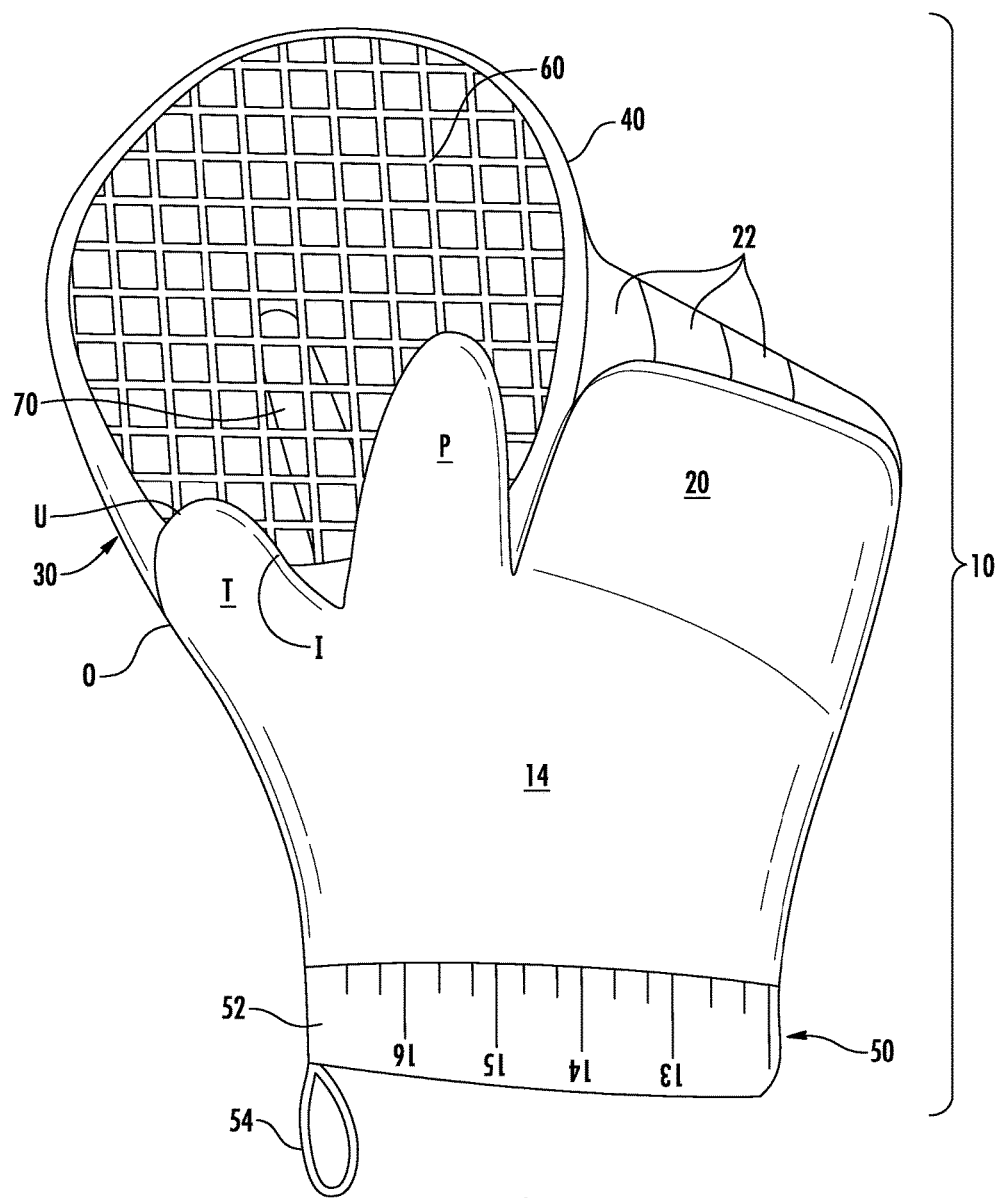
FIG. 2 is a top plan view of the interior to the left-handed fishing glove shown in FIG. 1.

Referring to FIGS. 1 and 2, there is shown a first version of this device, generally 10, with FIG. 1 focusing on the glove/mitt's exterior 12 and FIG. 2 the glove/mitt's interior 14. In this earlier "edition" of the Fish and Game Paw, the assembly included a fingers component 20, thumb component 30, a hooped net support 40 between the fingers 20 and thumb 30 components, a palm-cuff wrap element 50 and a main netting 60. In some instances, this glove with integral netting may resemble the netting portion of a goalie's stick in lacrosse.

In addition, there is provided a net support extension 70 that runs angularly upward from the natural gap between the glove wearer's pointer finger P and thumb T. For illustration purposes, the thumb T in these glove/mitts has an inner side I, an outer side O and uppermost tip U.

As shown in these FIGS. 1 and 2, net extension 70 ran closer to the inner side I of the wearer's thumb T and about half way up the lower body of main netting 60. It is to be understood, however, that alternate variations of net extensions (not shown) can run closer to the fingers component 20, extend a shorter OR longer distance upward of main netting 60 and/or consist of multiple extension elements (individualized or interconnected to one another).

Additional, optional elements depicted in this first variation of fishing glove/mitt include a built in tape measure 52, a hanging loop 54 for storing the device from one's gear when not in use, and a logo region 56 (for the possible placement of advertising thereon). The device holder/hanging loop 54 could also consist of a carabiner clip, purposeful aperture at or near the base of the palm-cuff (for hanging on a hook on one's gear/tackle box), or the latch tightening strings/cords themselves.

As for the three fingers component 20, they may include a plurality of finger tip pads 22 to assist the wearer in manipulating the glove/mitt to a less open/more closed position when grasping one's fish or "catch". As shown, each gloved finger has its own tip pad element 22. Preferably, these tip pads are interconnected to one another with webbing between. Alternately, they may be integrally formed as one "combined" unit.

Though not shown in the first embodiment views, the device may further include a latching, strap adjustment on its palm-cuff wrap 50. Several latch-lever alternatives are discussed below. They all serve to secure the glove/mitt to the wearer's left hand while quickly tightening or loosening the device thereabout using just the wearer's other/free or right hand. Many such strap adjustments include a ratcheting type mechanism, button release and/or a buckle configuration.

Figure 3:
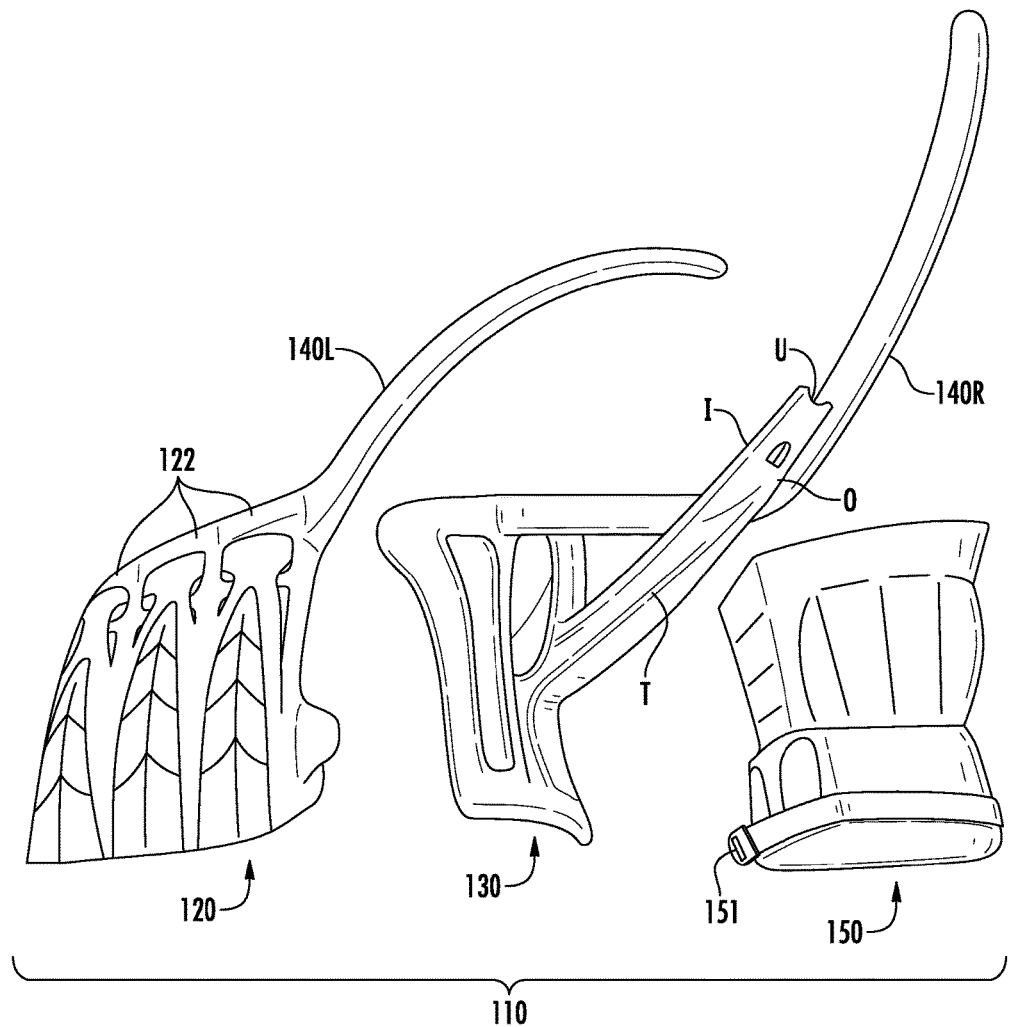
FIG. 3 is a top segmented view of the various main components that make up the main glove portion of a second preferred embodiment of fishing glove, said main components being, from left to right, the fingers component; the thumb netting support and the palm-cuff wrap (with the netting removed for illustration purposes)

FIG. 3 shows, in breakout (segmented) fashion, the main non-net components to a second preferred embodiment of this invention. Therein, the device, generally 110, consists of its three fingers component 120 (far left). While shown as a glove-like cover for three of the user's fingers, it is to be understood that four fingered covers are also anticipated hereby . . . especially for smaller sized (i.e., youth) anglers having generally smaller palms and digits.

Fingers component 120 has an integral left hoop support 140L curving upwardly and outwardly from the uppermost finger tip pad elements 122, particularly the farthest right pad element (into which the wearer's middle finger would be inserted; with his/her exposed pointer to the right of the same).

In the middle of FIG. 3, the wearer's thumb component 130 is shown having the other paired "half" of the netting holder, or right hoop support 140R extending upwardly and outwardly from its farthest right tip. Note, there are several possibilities of thumb net hoop projections in accordance with this invention. The hoop support may extend, rather rigidly: (i) from an area to the left (interior) of the wearer's thumb, closer to region I of thumb T in FIG. 2; (ii) from an area to the right (exterior) of the wearer's thumb, closer to region O of thumb T in FIG. 2; or (iii) from an area nearest the upper most tip U of the wearer's thumb T in FIG. 2. Each has advantages and disadvantages based on overall size of the device for a given wearer (adult versus child sizes) and/or in terms of net maneuverability when flexing one's thumb and finger components towards one another.

Both the finger 120 and thumb 130 components in FIG. 3 may be injection-molded from a plastic like ABS, a glass-filled nylon, a hard rubber and/or Xenoy polymer. They are all durable yet moldable to the desired shapes (and various wearer sizes) specified for this invention. A plastic thumb component may further include a rectangular pocket for assisting with fishing reel winding and unwinding while the glove is still on.

Finally, in the far right of FIG. 3, there is shown another alternative embodiment of palm-cuff wrap 150. When fully assembled as a glove/mitt unit, this wrap component 150 would have one of several possible latch mechanisms, generally 151, for better one-handed securing the whole device 110 on an angler's non-casting/reeling (or "recessive" hand. In other words, for a right-handed dominant fisherman, the whole glove-mitt assembly would get positioned on his/her left hand—similar to that of a baseball glove or mitt. Conversely, a left-handed angler could wear a mirrored equivalent of the device shown in these drawings on his/her "recessive" right hand.

In the versions shown in the remaining FIGS, starting with FIG. 3, the palm-cuff wrap is a section of resilient plastic softly molded to match the contours of the lower hand-to-wrist area of its wearer. It is also fully intended to have one of several preferred latch straps running through it. In some instances (especially for anglers with larger hands/wrists), this palm-cuff wrap may be coupled with a stand alone hinged area, or extra section of plastic material meant to accommodate more comfortable movement/manipulation of the palm-cuff wrap per se. This hinged area (see, FIG. 5) and latch strap combination can be moved to a first spot for keeping the glove cuff "open" and/or moved to a second spot for securing the glove/mitt to the wearer's fish-catching recessive (i.e., not the dominant) hand.

On the fingers component of this device, there may be added a separate support that extends at least partially over the glove wearer's (exposed) pointer finger. Such a support extension (not shown) would assist the wearer in using his/her pointer finger: (a) when closing the net about one's catch; and/or (b) aiding in other fish-catching activities like lipping the fish, etc.

Figure 4A:
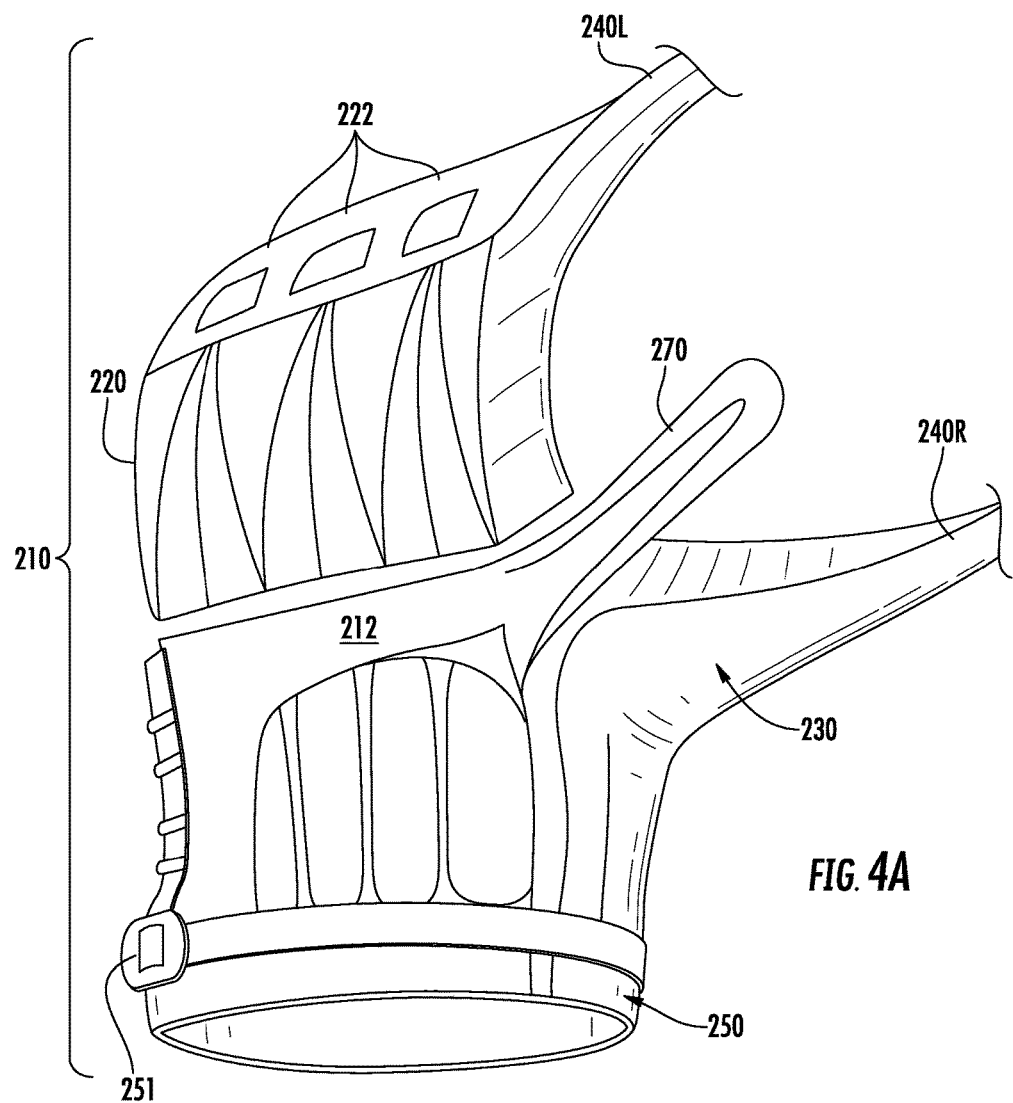
FIG. 4A is a top plan exterior view showing the FIG. 3 main components assembled together for wearing on an angler's left hand.
Figure 4B:
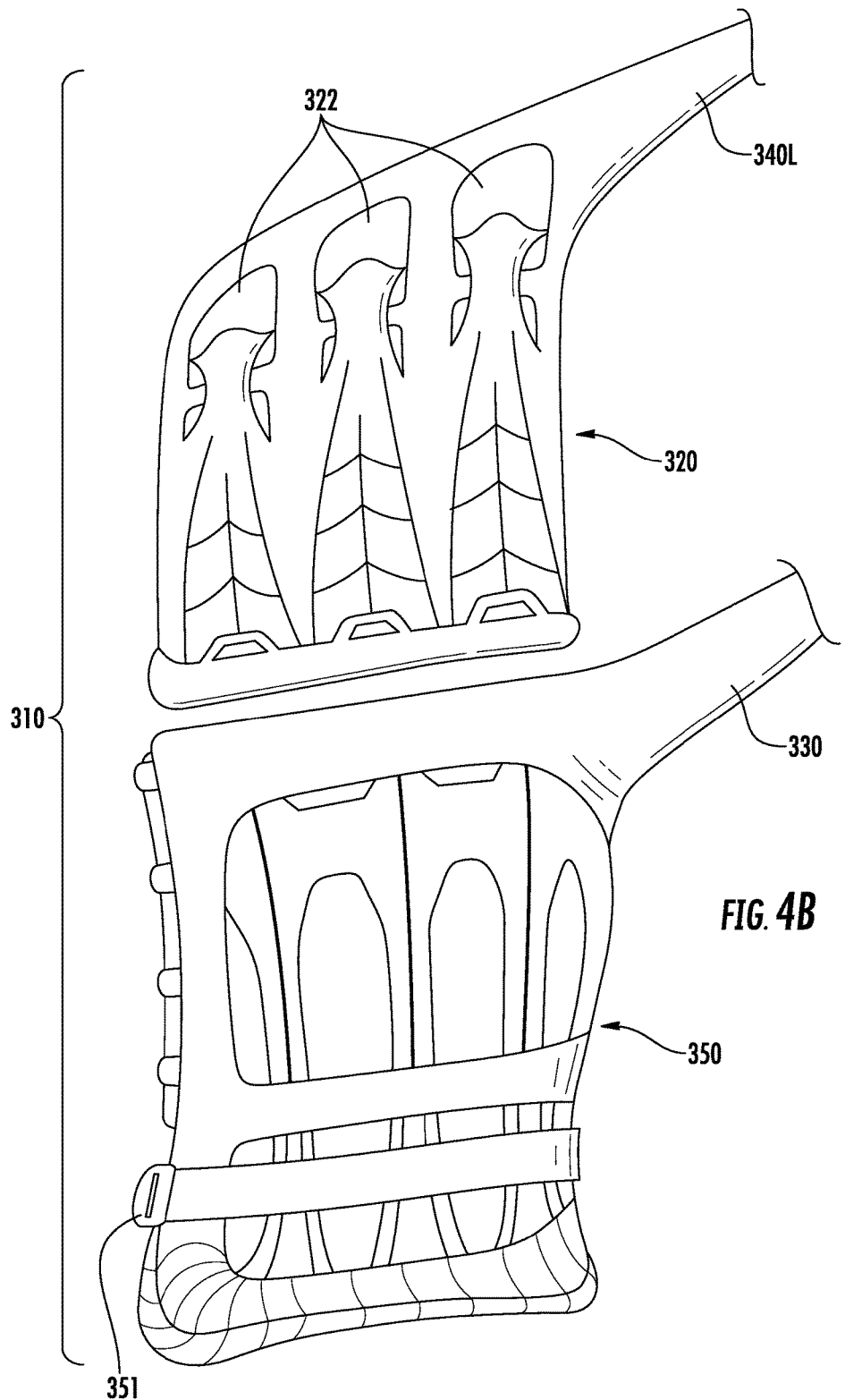
FIG. 4B is a top plan exterior view of a third alternative embodiment without any net hold back piece extending angularly upward from between the thumb and pointer finger of the glove wearer's hand.

FIGS. 4A and 4B contrast two alternative embodiments of assembled net supporting components with the difference being that the unit in FIG. 4A has a purposeful, angled netting hold back or extension 270 from either its fingers component 220 or thumb component 230. The assembly in FIG. 4B, by contrast, has no such ADDITIONAL netting support from between its fingers component 320 and thumb component 330.

Figure 5:
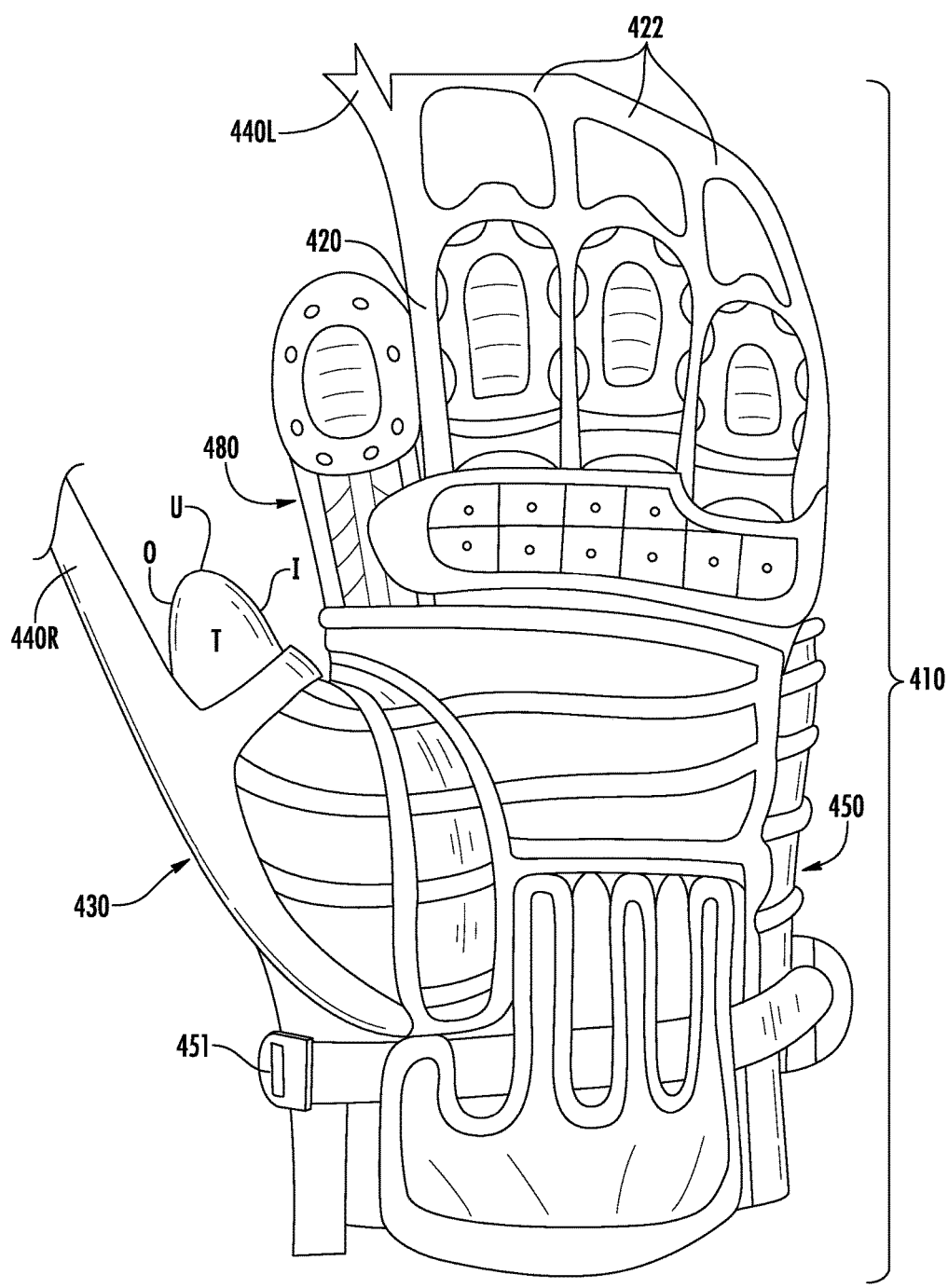
FIG. 5 is a top plan interior view of the third alternative embodiment depicted in FIG. 4B.
Figure 6:
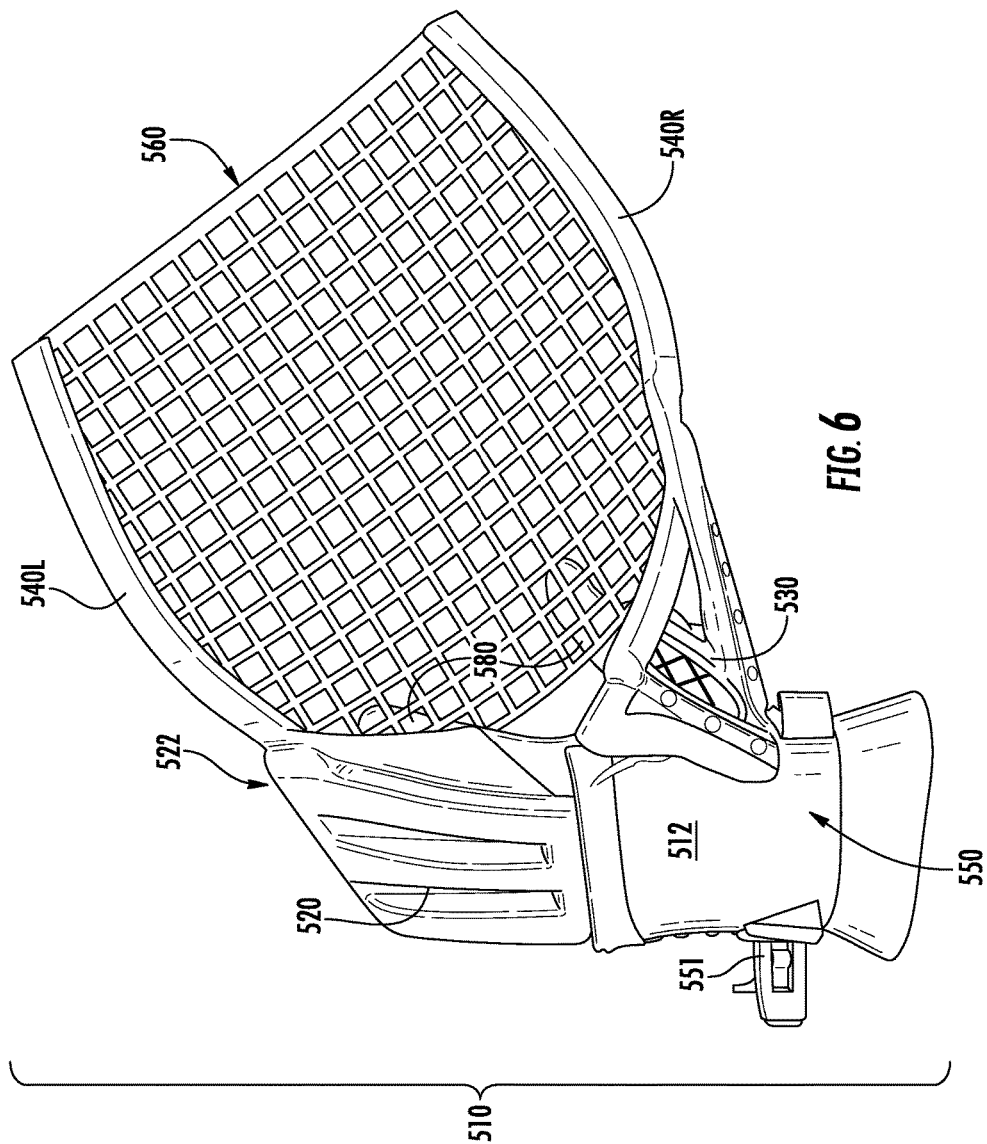
FIG. 6 is a top plan exterior view showing the third alternative embodiment from FIG. 4B with netting added and as worn on a glove user's left hand.
Figure 7:
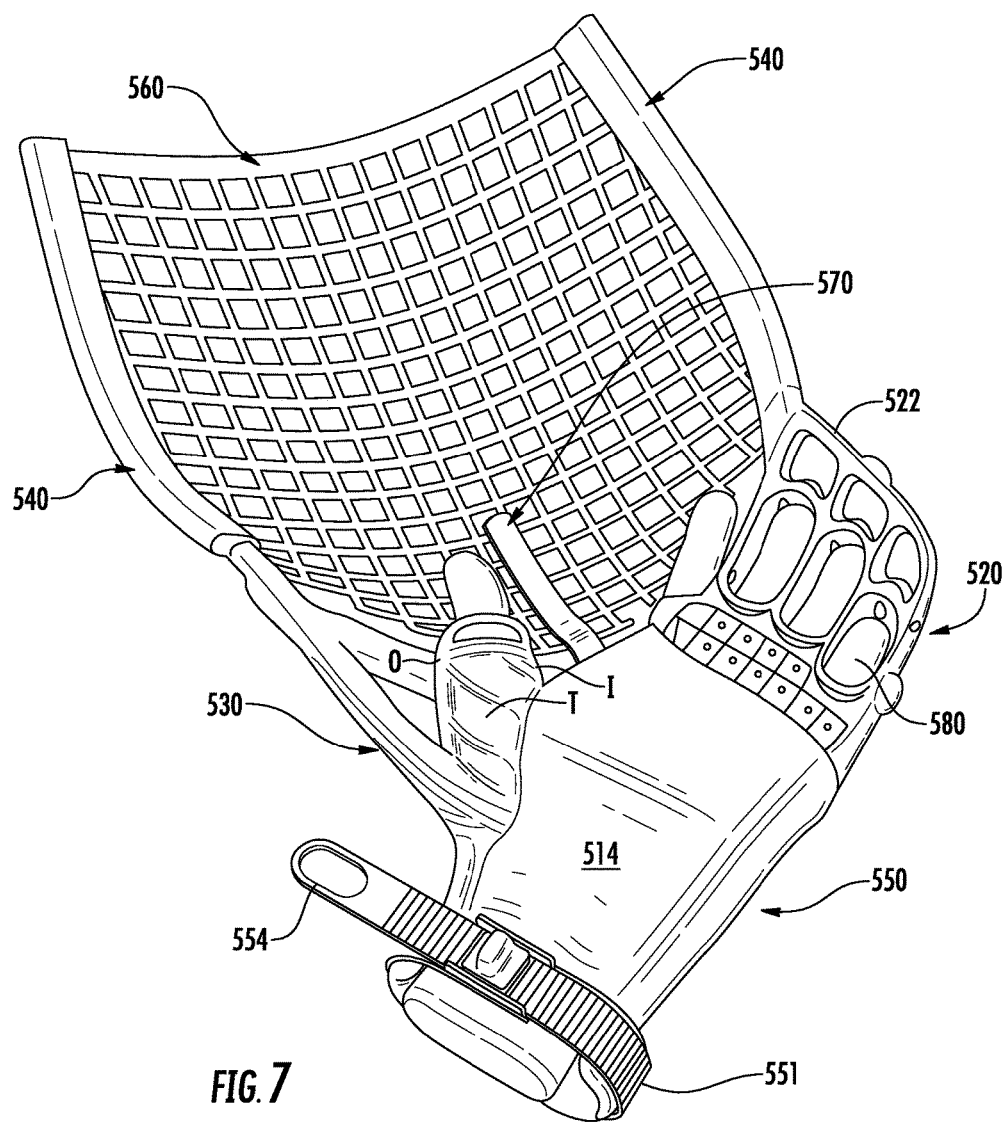
FIG. 7 is a top plan interior view of the third alternative embodiment from FIG. 6.

A glove component, element 480 in FIGS. 5 and 580 in FIGS. 6 and 7, may be integrally formed with the foregoing plastic parts though it is quite possible for this same invention to be made and sold in sections for self-assembly about one's own, preferred fishing glove/hand covering. When the actual glove is made integral with the other elements, it could be made from many varieties of flexible, yet comfortable materials including but not limited to: a texturized rubber or polyurethane for the palm side of this device and a bi-elastic fabric or neoprene for the backside for greater flexibility.

FIGS. 6 and 7 also exhibit a main netting component 560. Unlike the fully surrounded, hooped netting in FIGS. 1 and 2, this variation is about 75-80% framed and somewhat resembles the arm extension piece of a jai alai player. It is preferably made from rubber netting via injection molding and can be attached to its plastic under frame with wiring, strings, elastic and/or clips.

The rubber netting in the main embodiments of FIGS. 6 and 7 are sufficiently rigid, yet adequately malleable as to not expressly require additional netting reinforcement components. It will still easily hold its shape without accidentally turning inside out during use.

For nettings made of less rigid materials, it may be prudent to add support reinforcement extensions of some sort. One or more, separate (flexible) rods may be extended from the fingers component, thumb component or both in still other invention variations. One cost effective way of providing netting reinforcement would be to include one or more structural rod(s) as part of the injection molded part. At a minimum, one rod-like net support should prove adequate for keeping the netting right side out. Depending on how this netting gets made, there may not be a simple, sure-fire way to attach this netting to its underlying rod supports. A rod shaped with a flat profile would allow manufacturers to weave support(s) through a couple of rectangular openings in the rubber netting.

It is also suspected that a full rod extension to the uppermost edges of each netting may prove troubling from a usage standpoint (i.e., more difficult to manipulate open and closed) and a complexity in mass manufacturing. As such, any net reinforcements from the fingers and/or thumb components would be preferably kept intentionally "short" in length while still being adequate to provide some netting reinforcement properties.

Figure 8A:
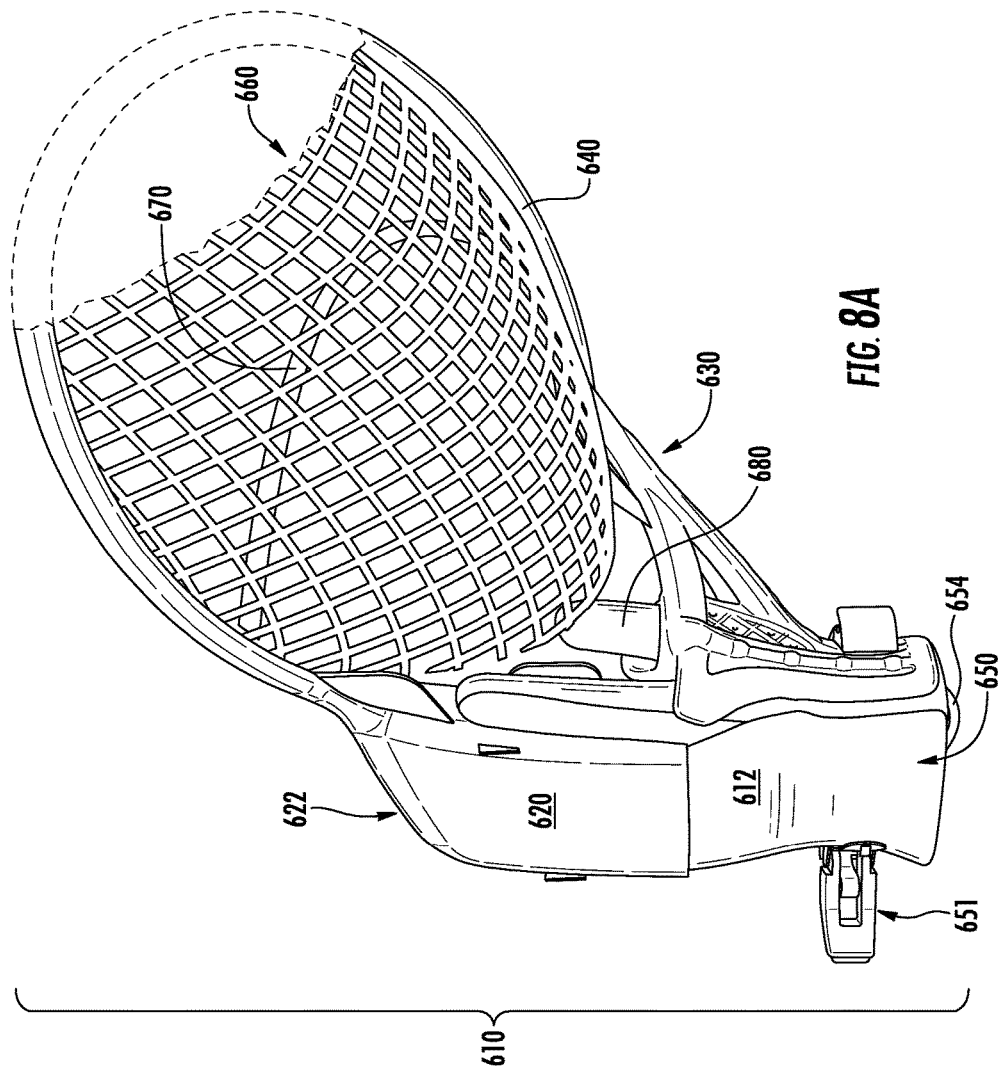
FIG. 8A is a top plan exterior view showing a fourth alternative embodiment with an arched net reinforcement for wearing on an angler's left hand.
Figure 8B:
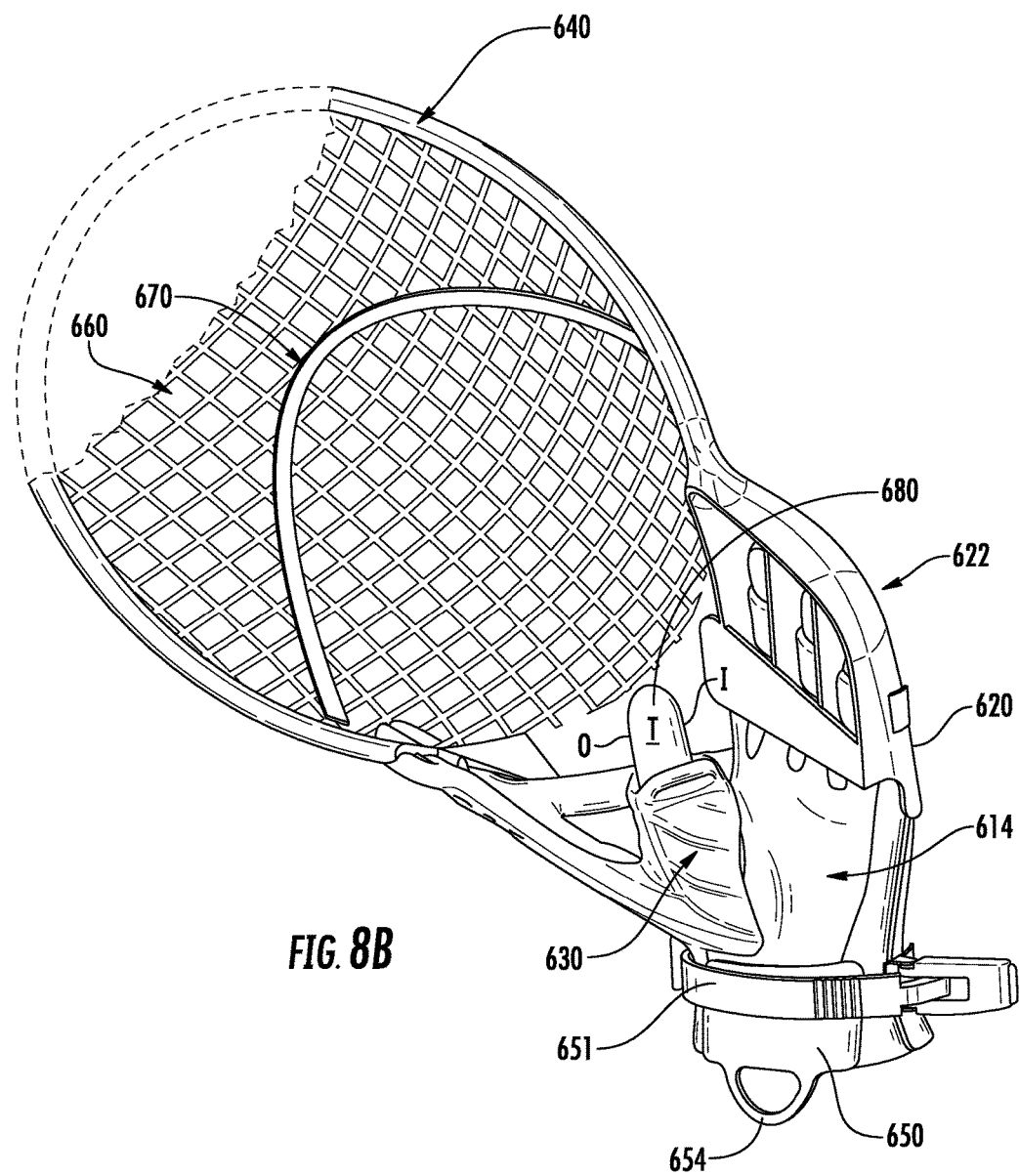
FIG. 8B is a top plan interior view of the fourth alternative embodiment depicted in FIG. 8A.

In FIGS. 8A and 8B, yet another variation of net extension is depicted. Therein, netting support is provided via an arched reinforcement rod 670 which extends between the lower edges of left net support 640L and right net support 640R while also arching upwardly between these two sides nearer the upper lateral, open framed edge 662 of netting 660 therein.

Figure 9:
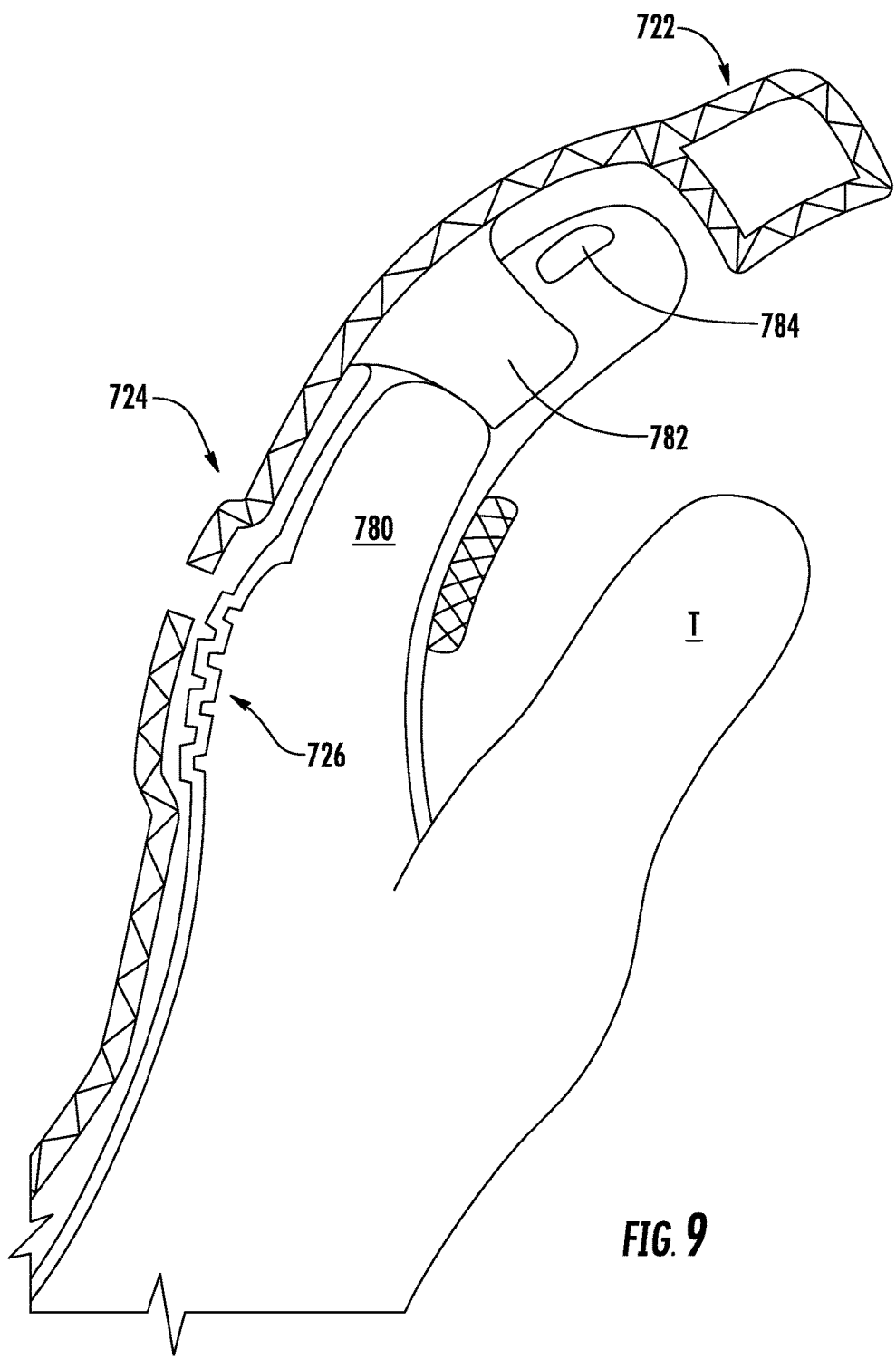
FIG. 9 is a side sectional view showing a first alternative middle finger configuration with its optional securing strap, vent hole and finger tip pad.

FIG. 9 shows, in partial cross-section, a first alternative arrangement for a finger tip pad 722, said alternative arrangement including a toothed lower edge 724 for interlocking to corresponding ridges 726 in its customized glove component 780. This variation would also have a cross-section of strapping 782 for further securing at least the middle, if not all three (middle, ring and pinky), finger components to its underlying glove component 780. FIG. 9 also illustrates the incorporation of intentional vent holes 784 into the uppermost finger tips of its glove component 780.

Several variations for latch strap attachments are also disclosed. FIG. 5 shows one main embodiment with a pull strap 490 and button release 492. It may include a plurality of "teeth" or notches there along. The device as a whole can be loosened and tightened to the wearer's hand, using just his/her other hand, depending on how much strap is inserted into and pulled through this strap stay.

Still other variations for latch tightening mechanisms include a drawstring arrangement with a plastic retainer. The cord from this drawstring can double as means for hanging the device from one's belt when not in use. These cords will tighten just by pulling on one end and release by merely pressing a button on the plastic retainer.

Device retention on the user's hand can also be accomplished by inserting plastic pieces on the inside and outside of the palm-cuff component with some stretchy fabric connecting the plastic pieces and an arm (or lever) for keeping the hand hole open until the wearer's hand is duly inserted.

It is important to note that invention covers various shapes and sizes of integral nettings as part of a fishing glove. Such netting may be close ended, as part of a hooped finger and thumb connector, or more open ended as per FIGS. 6 and 7, though with a more rigid upper end piece. It is also expected that the lower ends to this netting component may vary somewhat. In most instances, net webbing would extend at its lowermost edges to the fingers component, the thumb component, or both. Alternately, there may be an intentional gapping from the lower net webbing to these finger and thumb components based on wearer size (adult versus child angler), desired catch targeted (smaller fish and bait versus larger catches) and still other factors.

The interaction between finger-thumb components and the wearer's hand is also noteworthy. A main goal of this invention is to protect the wearer's hands while fishing. That would include, ideally, means for operating a fishing reel while still wearing one's glove on his/her hand. At a minimum, however, the device of this invention MUST provide for some form of glove-like covering to its wearer's thumb and a majority (three, if not all four) of his/her fingers. This glove-like covering can be made to fit into a prearranged configuration of components, built around a wearer's existing glove (as in a retrofit version) or, more preferably, provided as a stand alone, already fully assembled unit so that all one would need to do would be to slip his or her hand fully into the glove and netting/webbing "combination" before strapping the wrist-cuff wrap tightly thereabout.

Having described the presently preferred embodiments, it is to be understood that the invention may be otherwise embodied within the scope of the appended claims below.

What is claimed is:

1. A glove for wearing on one's hand when catching fish, said glove comprising:
    (a) a component into which at least three fingers of a hand are inserted;
    (b) a component into which a thumb from the hand is inserted;
    (c) a netting frame support extending between the fingers component and the thumb component;
    (d) a netting element that is sufficiently flexible as to be at least partially closable about one or more fish when the fingers component and the thumb component are moved towards one another;
    (e) a wrap for covering a cuff of the hand and protecting a palm area of the hand when the glove is being used to catch fish; and
    (f) a supplemental netting element support that prevents the netting element from inverting when in an open position.

2. The fish catching glove of claim 1 wherein the palm-cuff wrap includes a latch for tightening the glove to the cuff of the hand, said latch being operable with a hand opposite the glove-wearing hand.

3. The fish catching glove of claim 2 wherein the tightening latch includes a toothed strap and a button release through which the toothed strap is inserted and pulled.

4. The fish catching glove of claim 1 wherein the supplemental netting element support includes at least one extension angled upwardly from between the fingers component and the thumb component.

5. The fish catching glove of claim 4 wherein the supplemental netting element support extends upwardly for no more than half the length of the netting element.

6. The fish catching glove of claim 1 wherein the supplemental netting element support includes a curved arch segment connected at opposed ends to the netting frame support.

7. The fish catching glove of claim 1 wherein the netting frame support is a closed hoop onto which the netting element is installed.

8. The fish catching glove of claim 1 wherein the netting frame support is a plurality of upwardly curving extensions from the fingers component and the thumb component between which the netting element is installed.

9. The fish catching glove of claim 8 wherein the upwardly curving extension from the thumb component extends from an inner side of the thumb component.

10. The fish catching glove of claim 8 wherein the upwardly curving extension from the thumb component extends from an outer side of the thumb component.

11. The fish catching glove of claim 8 wherein the upwardly curving extension from the thumb component extends from an uppermost tip of the thumb component.

12. The fish catching glove of claim 1 wherein the fingers component include a plurality of finger tip pads.

13. The fish catching glove of claim 1, which further includes an integral glove about which the fingers component and the thumb component are installed.

14. The fish catching glove of claim 1, which further includes means for hanging up the glove when not in use.

15. A glove for wearing on one's hand when catching fish, said glove comprising:
   (a) a component into which at least three fingers of a hand are inserted;
   (b) a component into which a thumb from the hand is inserted;
   (c) a netting frame support extending between the fingers component and the thumb component;
   (d) a netting element that is sufficiently flexible as to be at least partially closable about one or more fish when the fingers component and the thumb component are moved towards one another;
   (e) a wrap for covering a cuff of the hand and protecting a palm area of the hand when the glove is being used to catch fish; and
   (f) a supplemental netting element support that prevents the netting element from inverting when in an open position.

16. The fish catching glove of claim 15 wherein the supplemental netting element support includes at least one extension angled upwardly from between the fingers component and the thumb component.

17. The fish catching glove of claim 15 wherein the supplemental netting element support includes a curved arch segment connected at opposed ends to the netting frame support.

* * * * *